United States Patent [19]

Loy

[11] Patent Number: 4,641,931

[45] Date of Patent: Feb. 10, 1987

[54] DUAL MAGNIFICATION TELESCOPE

[75] Inventor: Fernand R. Loy, Sceaux, France

[73] Assignee: U.S. Philips Corporation, New York, N.Y.

[21] Appl. No.: 874,878

[22] Filed: Jun. 16, 1986

Related U.S. Application Data

[63] Continuation of Ser. No. 716,883, Mar. 27, 1985, abandoned.

[30] Foreign Application Priority Data

Apr. 17, 1984 [FR] France .................................. 84 06058

[51] Int. Cl.$^4$ .......................... G02B 23/12; G02B 6/00
[52] U.S. Cl. ..................................... 350/538; 350/558; 350/96.25; 250/213 VT
[58] Field of Search ............... 350/538, 558, 508, 537, 350/576, 575, 96.24, 96.25, 96.26, 96.27; 250/213 VT

[56] References Cited

U.S. PATENT DOCUMENTS

| | | | |
|---|---|---|---|
| 2,992,587 | 7/1961 | Hicks et al. | 350/96.25 |
| 3,058,021 | 10/1962 | Dunn | 350/96.25 |
| 3,128,167 | 4/1964 | Woodcock | 350/96.25 |
| 3,142,235 | 7/1964 | Siegmund | 350/96.25 |
| 3,173,012 | 3/1965 | De Winter | 350/1.2 |
| 3,187,627 | 6/1965 | Kapany | 350/508 |
| 3,737,667 | 6/1973 | Babb et al. | 350/538 |
| 4,099,833 | 7/1978 | Tosswill | 350/96.25 |
| 4,152,724 | 5/1979 | Hunter | 358/109 |

Primary Examiner—Jon W. Henry
Attorney, Agent, or Firm—Marc D. Schechter

[57] ABSTRACT

The invention relates to a dual magnification telescope such as, for example, an intensifier telescope. Telescope compriser an objective, an intensifier tube with an optical fiber input, and an eyepiece. According to the invention, the dual magnification is obtained by an optical fiber array comprising straight fiber having unity magnification and tapered fibers having a magnification $G<1$.

8 Claims, 3 Drawing Figures

DUAL MAGNIFICATION TELESCOPE

This is a continuation of application Ser. No. 716,883, filed Mar. 27, 1985 and now abandoned.

BACKGROUND OF THE INVENTION

The invention relates to a dual magnification telescope comprising an objective and an eyepiece. When an intensifier tube is interposed between the objective and the eyepiece, the device functions as an intensifying telescope used for viewing at low light levels.

Generally, this type of telescope has only one field of view and one magnification factor used both for detection and identification. However, the identification range can be extended substantially by providing an additional narrower field of view. This can be achieved by using an objective having two focal lengths or a zoom objective. Such an objective, however, substantially increases the weight and price of the device because the objective has a very large aperture on the order of F/1.2.

SUMMARY OF THE INVENTION

It is an object of the invention to provide a dual magnification telescope whose weight and price are only slightly higher than those of a conventional telescope.

To this end, the device according to the invention comprises a tapered optical fiber array and a straight optical fiber array. The straight array has a constant thickness and unity magnification. The input faces of the arrays are situated in the focal plane of said objective. The output faces are situated in the focal plane of the eyepiece.

BRIEF DESCRIPTION OF THE DRAWING

FIG. 3b schematically shows the field of view through the eyepiece for the arrangement of the optical fiber arrays shown in FIG. 3a.

DESCRIPTION OF THE PREFERRED EMBODIMENTS

Figure 1:
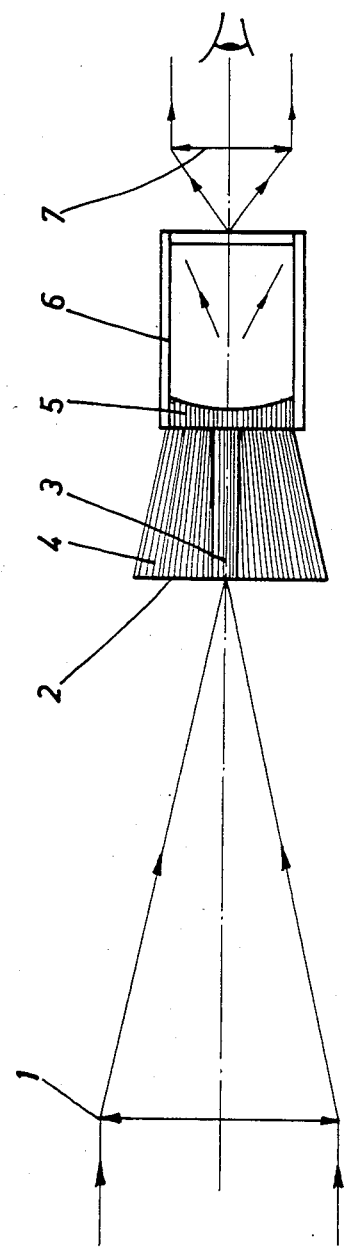
FIG. 1 schematically shows a dual magnification intensifier telescope according to the invention.

The intensifier telescope shown schematically in FIG. 1 has a conventional objective 1 with a large aperture, an intensifier tube 6 having an optical fiber input 5, and an eyepiece 7. Eyepiece 7 is focussed on the face plate of the intensifier tube.

According to the invention, the field of view is divided into two portions by an optical fiber array 2. Array 2 comprises a bundle 3 of straight fiber surrounded by a bundle 4 of tapered fibers. The tapered bundle 4 provides a magnification G which is less than unity.

The input face of the array 2 is situated in the focal plane 2 of the objective 1. The output face of the array 2 is in contact with the optical-fiber input of the intensifier tube 6.

Figure 2:
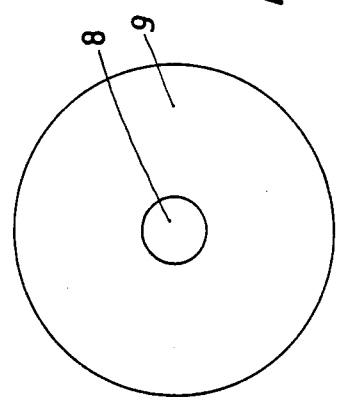
FIG. 2 schematically shows the field of view through the eyepiece for the concentrically arranged optical fiber arrays shown in FIG. 1.

FIG. 2 schematically shows the field of view through the eyepiece 7. The central area 8 corresponds to the field transmitted by the fiber bundle 3 of unity magnification. The peripheral area 9 corresponds to the field transmitted by the fiber bundle 4 having a magnification G.

If F is the focal length of the objective 1 and D in its diameter, its numerical aperture will be $N=F/D$. In the area 8, the optical system comprising the objective 1 and the fiber bundle 3 has the same numerical aperture as the objective alone, i.e. N.

In the area 9, the optical system comprising the objective 1 and the fiber bundle 4 has a numerical aperture $NG<N$, because $G<1$. Since diameter D of the objective 1 remains the same, the system comprising the objective 1 and the fiber bundle 4 will have a focal length $FG<F$.

In comparison with a conventional system having a focal length $F_o$, a pupil diameter $D_o$ and a numerical aperture $N_o=F_o/D_o$, a dual magnification intensifier telescope as shown in FIG. 1, comprising an objective of the same pupil diameter $D_o$, will have a focal length $F=F_oG$ in the area 9. It follows that $$\frac{F}{D_o} < \frac{F_o}{D_o},$$

so that $N<N_o$. This means that the performance of the telescope has improved. The same analysis is true for the area 8, because in this area with a reduced field the magnification is equal to that of the conventional system ($N=N_o$).

Figure 3B:
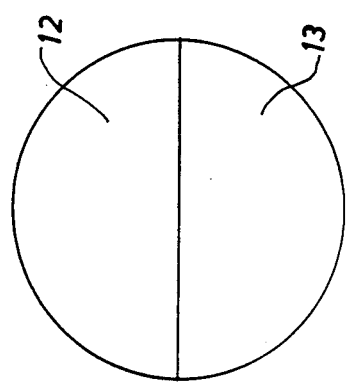
Figure 3A:
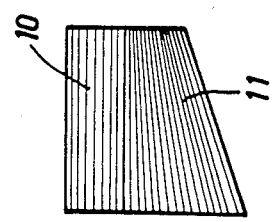
FIG. 3a schematically shows an alternative arrangement of optical fiber arrays according to the invention.

FIG. 3a shows another arrangement of the two optical fiber arrays. The bundle 10 of straight fibers and the bundle 11 of tapered fibers are situated on opposite sides of a plane containing the optical axis of the telescope.

The corresponding superimposed fields 12 and 13 viewed through the eyepiece are shown in FIG. 3b.

It is also conceivable that the fiber bundles 3 and 4 may be translated in such a way that they successively cover the input window of the intensifier tube.

This telescope may be used both in daylight television pickups and in low light level television pickups with optical fiber inputs.

What is claimed is:

1. A dual magnification telescope comprising:
   an objective for forming an image of a field of view; and
   an eyepiece for receiving the image of the field of view;
   characterized in that the telescope further comprises an optical fiber array arranged between the objective and the eyepiece for passing the image of the field of view through the fiber array to the eyepiece, said fiber array comprising a first bundle of optical fibers having a first magnification and a second bundle of optical fibers having a second magnification different from the first magnification, said first bundle passing a first portion of the image to the eyepiece, said second bundle passing a second portion of the image, different from the first portion of the image, to the eyepiece.

2. A dual magnification telescope as claimed in claim 1, characterized in that the first bundle of optical fibers is tapered and has a nonunity magnification.

3. A dual magnification telescope as claimed in claim 1, characterized in that the second bundle of optical fibers is straight and has unity magnification.

4. A dual magnification telescope as claimed in claim 1, characterized in that:
   the telescope has an optical axis; and the optical fiber bundles are arranged concentrically around the optical axis.

5. A dual magnification telescope as claimed in claim 1, characterized in that:
the telescope has an optical axis; and
the optical fiber bundles are arranged on opposite sides of a plane containing the optical axis.

6. A dual magnification telescope as claimed in claim 1, characterized in that the telescope further comprises an image intensifier arranged between the optical fiber array and the eyepiece for intensifying the image of the field of view from the fiber array and passing the intensified image to the eyepiece.

7. A dual magnification telescope comprising:
an objective for forming an image of a field of view; and
an eyepiece for receiving the image of the field of view;
characterized in that:
the telescope further comprises an optical fiber array arranged between the objective and the eyepiece for passing the image of the field of view through the fiber array to the eyepiece, said fiber array comprising a first bundle of optical fibers having a first magnification and a second bundle of optical fibers having a second magnification different from the first magnification;
the telescope has an optical axis; and
the optical fiber bundles are arranged on opposite sides of a plane containing the optical axis.

8. A dual magnification telescope comprising:
an objective for forming an image of a field of view; and
an eyepiece for receiving the image of the field of view;
characterized in that the telescope further comprises:
an optical fiber array arranged between the objective and the eyepiece for passing the image of the field of view through the fiber array to the eyepiece, said fiber array comprising a first bundle of optical fibers having a first magnification and a second bundle of optical fibers having a second magnification different from the first magnification; and
an image intensifier arranged between the optical fiber array and the eyepiece for intensifying the image of the field of view from the fiber array and passing the intensified image to the eyepiece.

* * * * *